United States Patent Office 2,727,165
Patented Dec. 13, 1955

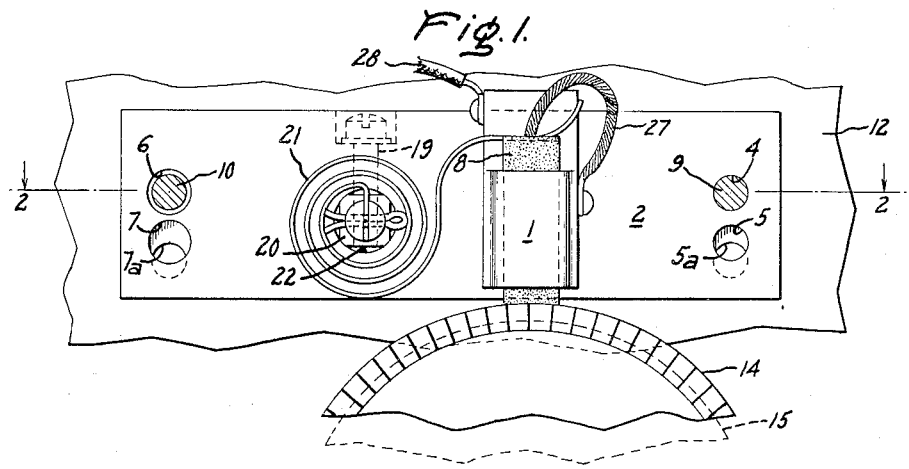
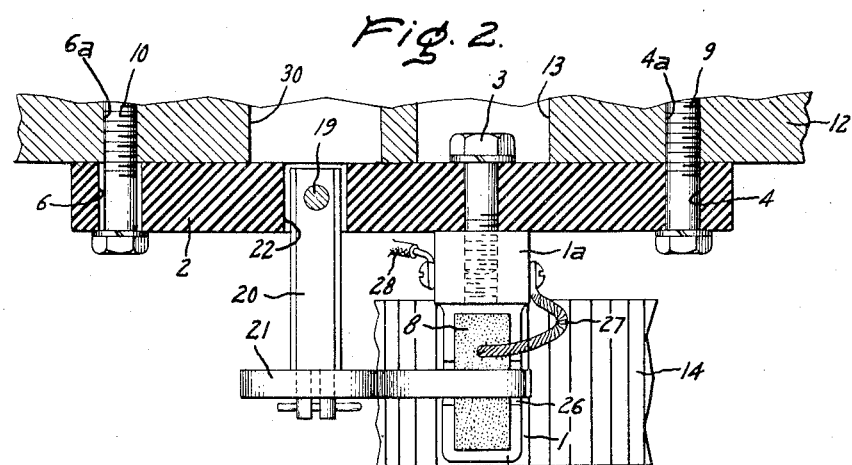
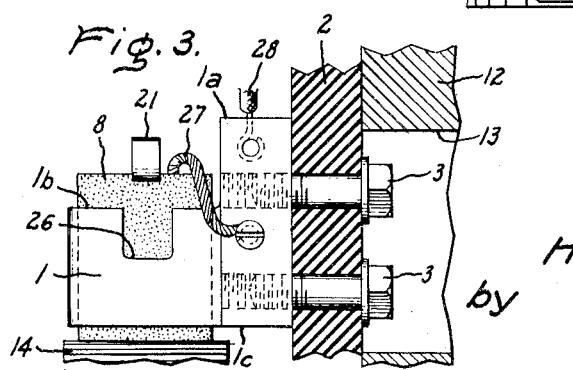

2,727,165

BRUSH-HOLDER FOR ELECTRIC MACHINES

Herman W. Schaffer, Erie, Pa., assignor to General Electric Company, a corporation of New York Application September 3, 1954, Serial No. 454,171

3 Claims. (Cl. 310—239)

This invention relates to brush-holders for use in dynamo-electric machines having rotatable current collectors, and more particularly to such brush-holders which employ spring means to bias the brush against the current collectors.

Commutators of dynamo-electric machines wear down or are turned down on a lathe to smooth the surface during use so that the brush-holder does not give adequate support to the brush in the region of the commutator. As the distance from the commutator to the brush-holder increases, the tendency for damaging vibrations in the end of the brush is also increased. To compensate for this reduction in commutator diameter, the brush-holder should be adjusted radially for good brush performance. In the past this adjustment has been obtained by various types of adjusting clamps. However, these means of adjustment require considerable space and are generally more expensive. Also, an accurate location of the brush circumferentially, as required for good commutation and speed regulation, is more difficult to obtain.

Therefore, it is an object of this invention to provide an inexpensive brush-holder mounting assembly that may be accurately adjusted to compensate for wear of the commutator without the danger of slippage of the mounting on its studs.

A further object is to provide a spring mounting that is accurate and fully insulated to prevent current through the spring.

For a better and more complete understanding of my invention, together with additional objects and advantages thereof, reference should now be had to the following detailed description taken in conjunction with the accompanying drawings in which:

Figure 1 is a plan view of the brush-mechanism, embodying this invention;

Figure 2 is a top view partially sectioned along the line 2—2 of Figure 1; and

Figure 3 is a side view of the brush-holder itself.

The brush-holder 1 is attached to an insulating support member 2 by some means such as bolts or studs 3. To provide for proper creepage distance from the bolts 3 to the frame 12, an aperture 13 is provided.

To provide an inexpensive, slip-proof and accurate means of radial adjustment of the brush-holder 1, several accurately positioned mounting apertures shown as holes 4 and 5 are provided on one side of the insulating support 2 and larger clamping apertures 6 and 7 are provided on the other side of the insulating support 2.

In order that the brush may be properly, yet inexpensively, circumferentially positioned, the mounting aperture 4 is machined to fit accurately the securing bolt 9. To provide slack for machining tolerances so that the insulating support 2 does not need to be precision molded or formed, the mounting apertures 6 and 7 are somewhat larger than the bolt 10, as shown. Thus, the two mounting apertures 4 and 5 provide an inexpensive means of circumferential positioning of the brush-holder relative to commutator segments. For maximum accuracy from the standpoint of good commutation, it is preferred that the more accurate apertures 4 and 5 be as close to the brush-holder 1 and to the commutator 14 as is practicable. This location will minimize the effect of the looseness of the apertures 6 and 7 respectively.

As the commutator 14 wears during operation to a size such as the size 15 shown as a dotted line, each pair of the mounting apertures 4, 6 and 5, 7, in conjunction with the cooperating pairs of threaded apertures 4a, 6a, and 5a, 7a provide for a certain radial position of the holder 1 relative to the commutator 14. This is made possible by the spacing differential along the line parallel to the axis of the brush 8 and brush-holder 1 between these pairs of mounting apertures compared to the cooperating pairs of threaded apertures. When the commutator is worn or turned down reducing the diameter by one-fourth inch, the brush-holder may be mounted one-eighth inch closer to the center of the commutator by using the mounting apertures 5 and 7 and their cooperating threaded apertures 5a and 7a to mount the insulating support 2 instead of the mounting apertures 4 and 6 and their cooperating threaded apertures 4a and 6a as shown in Figure 2. Again the aperture 5 is precision fitted to the bolt 9 to properly position the brush-holder 1 circumferentially with respect to the windings and segments of the armature in this closer position, and the loose-fitting aperture 7 only provides the necessary clamping action.

In order that the brush spring 21 will not carry current between the brush-holder 1 and the brush 8, the spring is mounted by means of pin 20 on the insulating support 2 instead of on the brush-holder 1. The aperture 30 provides sufficient creepage distance between the pin 20 and the metal frame 12 of the machine to prevent ground faults. With this mounting, the spring 21 cannot carry current. This results in a spring mounting which will not heat the spring directly by brush current to effect the physical properties of the spring or contact pressure between the brush 8 and the commutator 14.

In the preferred form of my brush-holder, the square pin 20 is used to support the spring 21 in a rigid and permanently tight mounting. The square section of the pin 20 is rounded at the corners to fit the round hole 22 and obtain a V block effect. The V block effect is often used to align a cylindrical member firmly and accurately in a slot which has upwardly divergent sides. The use of this V block effect in placing a rectangular pin in a circular hole still provides the firm and accurate alignment that is required to position the spring 21 in a vibration-proof mounting. To provide proper rigidity, the spring support pin 20 is internally threaded so that a bolt 19 may tighten it to a very rigid and square assembly with adequate contact pressure surfaces at the two upper rounded corners of the square section of the pin 20. This assures a permanently rigid assembly that is economical.

The preferred form of the brush-holder 1 is simple and inexpensive to manufacture by extrusion in the form of a rod having a cross section as shown in Figure 2, or simple fabrication of a folded three-sided carbon box section brazed to the main body. When the brush-holder 1 of this very simple form is extruded, a cut at the top surface 1a of the main body, a cut at the top surface 1b of the box section, and a cut across the bottom 1c of the brush-holder complete its shaping. A slot 26 as shown in Figure 3 may be added to accommodate the spring 21 when the brush has worn considerably. Various tapped holes may be added to attach the bolts 3, the pigtail 27, and power lead 28.

This construction results in a simple and inexpensive brush-holding mechanism that may be simply, rigidly and accurately positioned both circumferentially and radially. The brush spring will not carry current and is also simply and firmly positioned.

While there has been described what is at present considered to be the preferred embodiment of this invention, it will be obvious to those skilled in the art that various alterations and modifications may be made therein without departing from the invention and it is, therefore, intended by the appended claims to cover all such changes and modifications as fall within the true spirit and scope of this invention.

What I claim as new and desire to secure by Letters Patent of the United States is:

1. In a dynamo-electric machine having a rotatable current collector, a brush-holder assembly comprising a frame member, a support member of insulating material, an electrically conducting brush-holder member provided with a passageway extending therethrough to accommodate a brush being mounted on said supporting member with said passageway extending axially toward the current collection, said frame having two pairs of spaced threaded apertures, said support member having two pairs of spaced mounting apertures of different center-to-center spacing parallel to the line of said passageway than said matching threaded apertures arranged so that either pair of mounting apertures may be used with the corresponding pair of threaded apertures to provide for adjustment of said support member along the line of said passageway, mounting bolts to engage one pair of said threaded apertures through one pair of said mounting apertures and secure said member on said frame, a coil spring for biasing said brush into contact with said current collector, a spring support pin for said spring and a mounting for said support pin on said stationary supporting member for accurately and rigidly positioning said pin in said stationary supporting member.

2. In a dynamo-electric machine having a rotatable current collector, a brush-holder assembly comprising a frame member having two pairs of radially spaced threaded apertures, a support member of insulating material, an electrically conducting brush-holder member provided with a passageway extending therethrough to accommodate a brush being mounted on said supporting member with said passageway extending axially toward the current collector, said support member having two pairs of radially spaced mounting apertures being of different center-to-center spacing parallel to the line of said passageway than said corresponding threaded apertures arranged so that either pair of mounting apertures may be used with the corresponding pair of threaded apertures to provide for adjustment of said support member along the line of said passageway, mounting bolts to engage one pair of said threaded apertures through one pair of said mounting apertures and secure said member on said frame, one of each of said pairs of mounting apertures being a close fit on said mounting bolts to position said support member circumferentially and the other of said apertures being enlarged to allow for machining tolerances, an electrically conducting brush-holder member provided with a passageway extending therethrough to accommodate a brush, said brush-holder member mounted on said supporting member with said passageway extending axially toward the current collector, a coil spring for biasing said brush into contact with said current collector, a spring rectangular support pin for said spring positioned in another circular aperture of said support member to provide an insulated mounting for said support pin on said stationary supporting member for accurately and rigidly positioning said pin.

3. In a dynamo-electric machine having a rotatable current collector, a brush-holder assembly comprising a frame member having two pairs of radially spaced threaded apertures, a support member of insulating material having two pairs of radially spaced mounting apertures, an electrically conducting brush-holder member provided with a passageway extending therethrough to accommodate a brush being mounted on said supporting member with said passageway extending axially toward the current collector, said mounting apertures being adapted to cooperate with said respective threaded apertures but being of different spacing parallel to the axis of said passageway than said threaded apertures so that either pair of mounting apertures may be used with the corresponding pair of threaded apertures to provide for radial adjustment of said support member with respect to the rotatable current collector, mounting bolts to engage one pair of said threaded apertures through one pair of said mounting apertures and secure said member on said frame, a coil spring for biasing said brush into contact with said current collector, a spring support pin for said spring and a V-block mounting for said support pin on said stationary supporting member for accurately and rigidly positioning said pin in said stationary supporting member.

References Cited in the file of this patent

UNITED STATES PATENTS

| | | |
|---|---|---|
| 629,823 | Short | Aug. 1, 1899 |
| 922,107 | Dunn | May 18, 1909 |
| 1,275,458 | Meston | Aug. 13, 1918 |

FOREIGN PATENTS

| | | |
|---|---|---|
| 568,687 | France | Dec. 26, 1923 |
| 699,025 | France | Dec. 8, 1930 |